United States Patent [19]

Wen

[11] Patent Number: 5,199,458

[45] Date of Patent: Apr. 6, 1993

[54] MULTI-WAY VALVE

[76] Inventor: Bang Y. Wen, P.O. Box 5501, Ruian, Zhejiang, China

[21] Appl. No.: 756,448

[22] Filed: Sep. 9, 1991

[30] Foreign Application Priority Data

Sep. 15, 1990 [CN] China ............................ 90107846

[51] Int. Cl.$^5$ .............................................. E03B 7/07
[52] U.S. Cl. ................................ 137/549; 137/625.47; 210/390
[58] Field of Search ........................... 137/549, 625.47; 210/390, 392

[56] References Cited

U.S. PATENT DOCUMENTS

| 1,646,514 | 10/1927 | Winton | 210/390 |
| 2,095,217 | 10/1937 | Jones | 210/390 |
| 3,348,694 | 10/1967 | Smith | 210/390 |
| 3,779,388 | 12/1973 | Coughlin | 210/390 |

FOREIGN PATENT DOCUMENTS

| 3463 | 1/1879 | Fed. Rep. of Germany | 210/390 |
| 432119 | 7/1926 | Fed. Rep. of Germany | 210/392 |
| 3030477 | 3/1992 | Fed. Rep. of Germany | |
| 16460 | of 1915 | United Kingdom | 210/390 |

Primary Examiner—A. Michael Chambers

[57] ABSTRACT

A multi-way valve of the present invention is to locate the rotatable valve core by the openings set in the valve body, the valve ports and the valve core are to be optimally sealed. An L-shaped passage is provided in the valve core, wherein a filter element is appropriately fitted. Thus it has the functions of filtering, reverse flushing of the filter element, shutting off the medium source, and serving as pre-valve and post-valve by-pass. The multi-way valve of the present invention can be further incorporated in the inlet and outlet passages of an automatic control valve. By using the valve of the present invention, three hand-operated valves, a filter and other accessories of pipeline can be omitted, the pipeline arrangements can be significantly simplified. Such valves can have their filter elements expediently reverse - flushed without taking out the filter element, and can be suitably used with its filter element flushed either by the medium source itself which flows in the pipeline, or by a different medium. They can also be used to flush the valves, pumps and other apparatus in the pipelines, and make the pipeline systems simple and easy to operate.

4 Claims, 5 Drawing Sheets

Fig. 3a  Fig. 3b  Fig. 3c  Fig. 3d

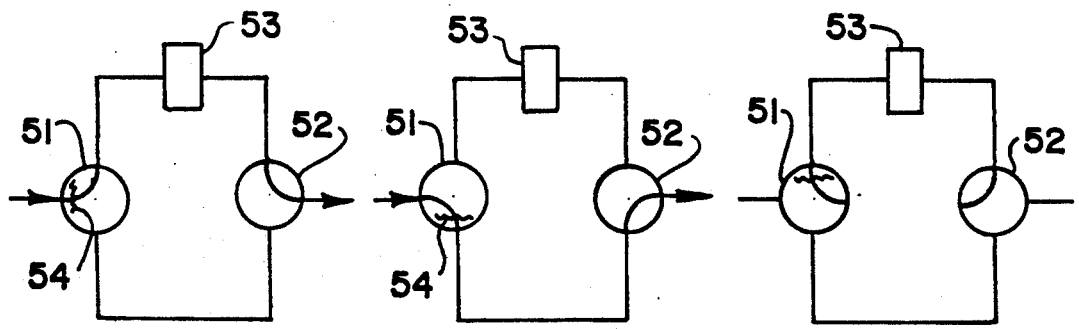
Fig. 5a   Fig. 5b   Fig. 5c
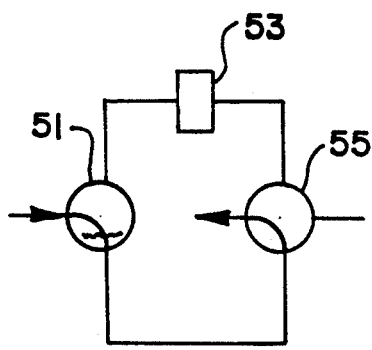 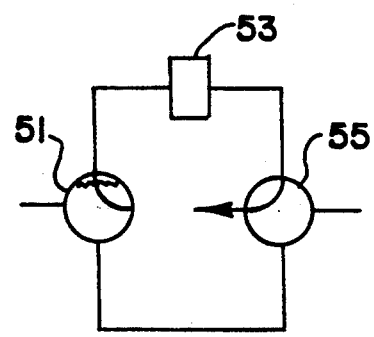
Fig. 5d   Fig. 5e
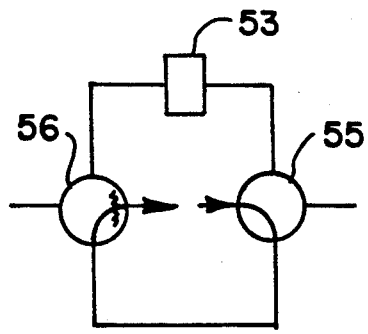 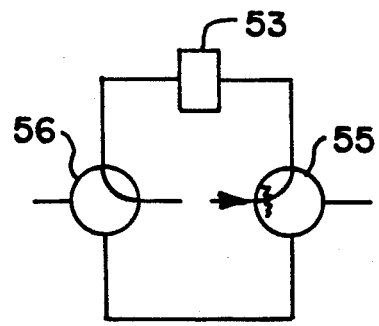
Fig. 5f   Fig. 5g

MULTI-WAY VALVE

TECHNICAL FIELD OF THE INVENTION

This invention relates to a multi-way valve, in particular a multi-way valve with a filter element. Using such a multi-way valve with a filter element not only is it possible to reverse flush the filter element by turning the valve, it has also the function of a stop valve, thus the pipeline system can be greatly simplified and a plurality of hand-operated isolating valves can be omitted.

BACKGROUND OF THE INVENTION

Filters are commonly used in existing pipeline systems. The filter elements in the filters will become clogged by debris carried in the medium and need to be cleaned from time to time by closing the hand-operated isolating valves to shut off that stretch of piping and taking out the filter element to flush off the debris. This process is time-and labor-consuming. The German Patent DE 3030447 discloses a three-way valve with a floating spheroidal valve core, with a filter element incorporated in its valve core. This valve can have its filter element reverse-flushed on line. However, it has the following two major shortcomings: (1) Owing to the floating spheroidal valve core, the valve can only have two sealing seats disposed in two ports of its valve body along a rectilinear flow path, it can therefore have only two modes of flow, i.e. filtered flow and reverse-flushing. It is not intended, therefore it is not possible, to shut off the medium source. Hence a hand-operated isolating valve has to be installed in front of this valve. (2) The filter element is retained in position by two washers, two seal-rings and a retaining ring, therefore the flow cross-section is restricted; the assembly comprises a multiplicity of parts and thus a relatively high cost is incurred.

In the usual practice of pipeline arrangements, it normally requires a number of two-way valves. In FIG. 1b the square symbol T represents a tank, having two hand-operated valves $V_1$ and $V_2$ located in its up-stream and down-stream pipeline for controlling the in-flow and out-flow of the medium. There is also a hand-operated by-pass valve $V_3$. FIGS. 1c and 1d show respectively systems with two tanks $T_1$ and $T_2$ and three tanks $T_1$, $T_2$ and $T_3$, each with three valves $V_1$, $V_2$ and $V_3$ connected in the pipeline. In FIG. 1a the system contains an automatic control valve 11 and three hand-operated valves 13, 14 and 15. Valve 13 stops the in-flow of the medium to the automatic control valve, valve 14 is a by-pass valve, and valve 15 controls the out-flow of the medium from the automatic control valve, either for the medium retained in the valve or in the pipeline arrangements in the rear of the valve. Obviously these systems are complicated. It could be much simplified if the illustrated three valves are replaced by a single valve. This is not possible by using the prior art valve.

SUMMARY OF THE INVENTION

The objective of this invention lies in the comprehensive solution of the mentioned problem of reducing the number of valves and improving the flow conditions in the pipeline system. It is intended that not only is the filter element incorporated in the valve to be expediently reverse-flushed, but possibility is also to be rendered to isolate the medium source with the same valve, together with to provide an ample cross-section for the medium to flow through the valve and simplify the structure of valve thus reducing the cost. Another objective of this invention is intended to get additional flow modes of the multi-way rotatable valve, and to simplify the pipeline arrangements, in particular to simplify pipeline arrangements when used in conjunction with an automatic control valve.

The above mentioned requirements are fulfilled mainly through the following technical considerations:

(1) The axis of rotation of the valve core is located in position by the bores in the valve body; the valve body is provided with at least three ports; the valve core has an L-shaped passage in it to selectively engage with said ports in the valve body, the engagement of the passage in the valve core with two of the ports being hermetic and the flowing medium being isolated from the cavity between the valve casing and the valve core; a filter element is incorporated in the passage of the valve core.

(2) The filter element is cylindrical in shape and is snugly fitted with the inner wall of one leg of the L-shaped passage in the valve core, the annular space around the outside of the middle portion of the filter elements is in connection with the other leg of the L-shaped passage.

(3) Among a plurality of the above-mentioned ports in (1), the valve body of the multi-way rotatable valve is provided with such a port, the cavity joining said port can be connected with the two ends of L-Shaped passage in the valve core.

(4) The rotatable valve core is to be incorporated in the inlet passage or inlet and outlet passages of an automatic control valve.

(5) At the bottom portion of the multi-way valve is also provided with an auxiliary opening, this auxiliary opening is in connection with the cavity within the valve casing or with the passage in the valve core. This opening can be used for mounting pressure gauge, automatic valve or other pipeline accessories.

BRIEF DESCRIPTION OF THE DRAWINGS

The multi-way valve of the present invention is now described in detail with reference to the accompanying drawings:

FIGS. 3a–3d show the modes of flow for the valve of FIG. 3;

FIGS. 5a–5g are schematic diagrams showing the use of the multi-way valve of the present invention in various pipeline arrangements.

DETAILED DESCRIPTION OF THE PREFERRED EMBODIMENTS

Figure 2:
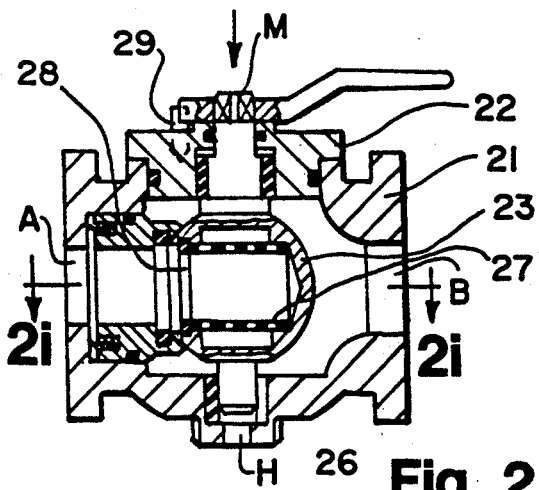
FIG. 2 is a sectional view showing the structural features of a first embodiment of the multi-way valve of the present invention.
Figure 2I:
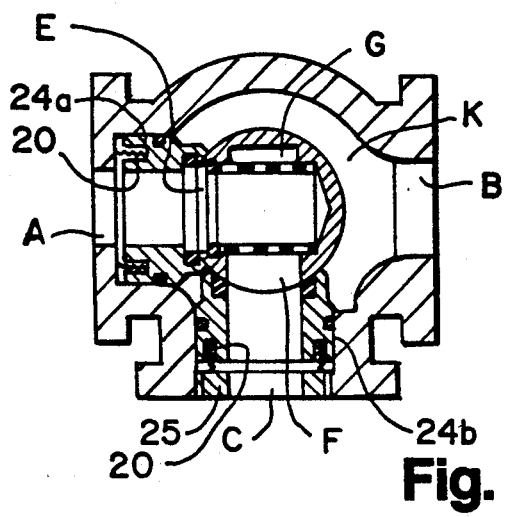
FIG. 2i is a sectional view of the valve in FIG. 2 in the direction indicated by the line 2i—2i.

The first embodiment of the present invention shown in FIG. 2 is a three-way reverse-flush type filtering-valve which is one type of a hand-operated rotatable valve. It comprises a valve body 21, a valve cover plate 22, a spheroidal valve core 23 and valve seat members 24a and 24b which can be in hermetic engagement with the valve core 23. Three ports are provided on the valve body 21, namely A, B and C. Valve core 23 is rotatably supported by its top and bottom journals in bearings provided in bores in the valve cover plate 22 and the valve body 21. An L-shaped passage is provided in the valve core 23. A cylindrical filter element 27 is snugly fitted to the inner wall of one leg E of the L-shaped passage and kept in place by a retaining ring 28. An annular space G is provided around the exterior of the middle portion of the filter element 27, this annular space G is in communication with the other leg F of the L-shaped passage. Valve seat members 24a and 24b are slidably received in the two angularly disposed ports A and C, said valve seat members are pressed against the valve core by means of compression springs 20. The L-shaped passage can be hermetically connected with the valve ports A and C, thus preventing the medium flowing under pressure from entering the cavity in the valve body other than the L-shaped passage. No valve seat is provided at the port B, a cavity K exists between the valve casing and the valve core and is in communication with the valve port B.

Figure 2M:
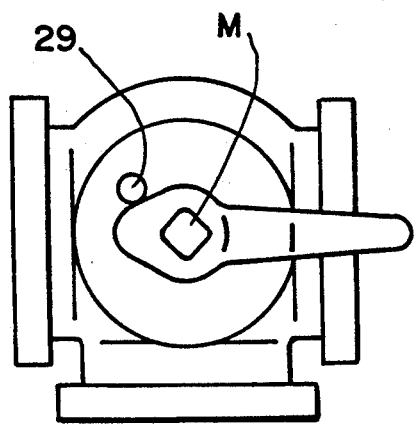
FIG. 2m is a view of the valve in FIG. 2 in the direction indicated by the arrow M.
Figure 2A:
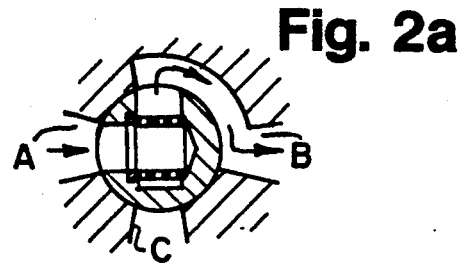
FIGS. 2a–2f show the modes of flow for the valve of FIG. 2.
Figure 2B:
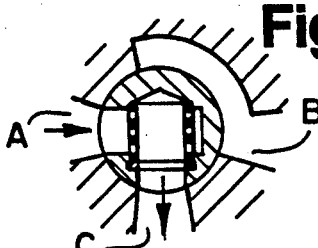
Figure 2C:
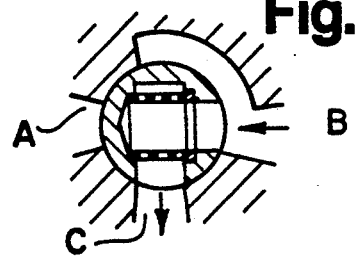
Figure 2D:
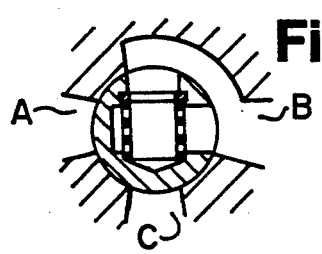

A handle is slipped onto the square shank of the valve core. Turning the handle can effect the valve to be in four modes of flow schemes. Taking port A as the inlet, port B as the outlet and port C as the by-pass, this will result in a straight-through flow mode. When the valve core 23 is turned into the position shown in FIG. 2a, the medium flows from A to B, this is a filtration flow, debris will be retained on the inner surface of the filter element. FIG. 2b depicts a pre-valve by-pass flow mode from A to C, wherein the medium flows via the outer surface through the filter element entering the inside of the filter element and out of port C, thus effecting a reverse flushing of the filter element. FIG. 2c depicts a post-valve by-pass flow mode from B to C, effecting draining process. FIG. 2d is a shut-off mode, whereby all three ports A, B, C are not connected with one another.

If port C is taken as the inlet, port B as the outlet and port A as the by-pass, this will result in an angular-flow mode. It will likewise provide four modes of flow schemes similar to the above, hence will not be described in detail.

It can be seen that this embodiment of the present invention has three distinct advantages over that disclosed in the reference document DE 3030447, namely; (1) The axis of the valve core is fixedly located in alignment with the line joining the bores in the valve casing, also the valve seats are located in two angularly disposed valve ports, thus it has the function of shutting off the pressurized medium, and the hand-operated isolating valve preceding the filter can be omitted; (2) The filter element is snugly fixed against the inner wall of the flow passage, thus providing ample cross-section for the flow, also the number of parts required is reduced, and hence the cost; (3) The outlet port B is not provided with a valve seat but is provided with a cavity K which is capable of connecting the two ends of L-shaped passage in the valve core, whereby an additional flow mode can be attained, and both a straight-through flow mode and an angular flow mode can be effected. Moreover, it can serve as pre-valve and post-valve by-pass, thus replacing the three hand-operated valves and the filter shown in FIG. 1a altogether.

Figure 1A:
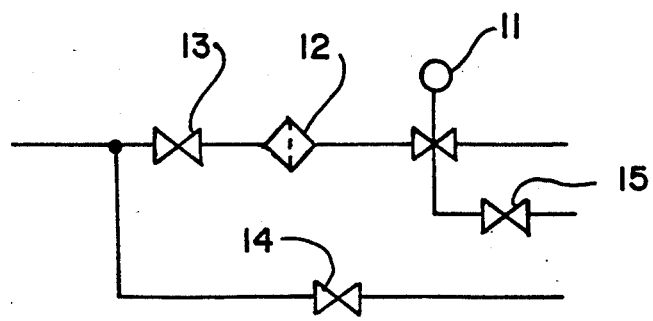
FIGS. 1a–1f are schematic diagrams of prior art pipeline arrangements.
Figure 1B:
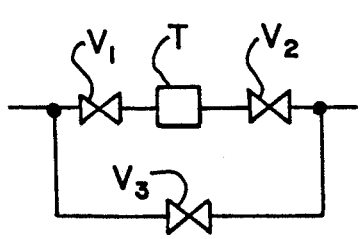
Figure 1C:
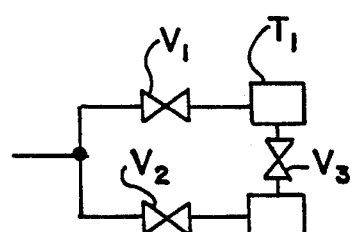
Figure 1D:
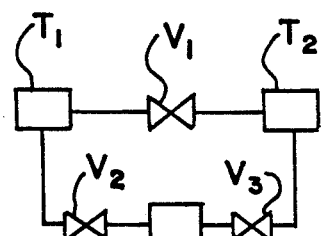

Even if this embodiment is not fitted with the filter element, because it can provide four flow modes, it can still replace three hand-operated valves in FIGS. 1b–1d.

This embodiment is further provided with a stop-pin 29 on its valve cover plate. This pin will limit the turning of the handle. Thus in the position of the handle shown in FIG. 2m, it can only be turned at first in a counter-clockwise direction until it reaches the pin, then it can only be reverse turned in a clockwise direction, thus preventing turning the valve core into a position where the dirty surface of an unflushed filter element is exposed to the outlet of the valve.

To attain the optimal sealing force acting on the valve seat, an adjusting member 25 is provided. The ring-shaped adjusting member 25 has an external thread which mates with the internal thread in the bore of the valve port, thus enabling a fine adjustment of the compression of spring 20.

The valve body 21 of this embodiment is further provided with an auxiliary opening H at its bottom, which communicates with the cavity K in the valve body through a groove in the bearing 26. This opening can be used for connection with other accessories, such as pressure gauge, safety valve and steam trap etc., thus providing a possibility for further simplifying the pipeline system. If it is desired to connect this auxiliary opening with the L-shaped passage in the valve core, it needs only to drill a through hole in the journal at the bottom of the valve core without providing the groove in the bearing 26 (not shown in the diagram).

The valve of the present invention can also be operated by motor, pneumatic or hydraulic actuators. The valve core can be spheroidal, or it can be conoidal.

Figure 2E:
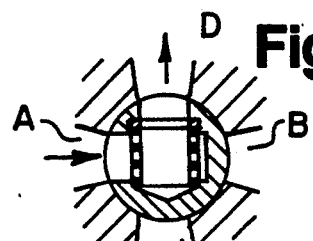
Figure 2F:
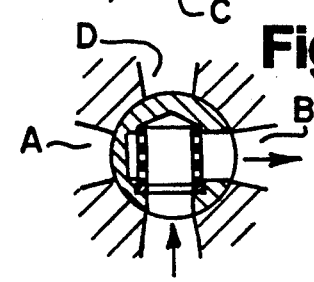

This embodiment can be further developed into a four-way reverse-flushing filtering-valve with a fourth port D added to it. In such an embodiment a second medium can be used for the reverse flushing of the filter element other than to use the medium source itself. FIG. 2e shows the valve in its filter- and flow-through mode, while FIG. 2f shows it being flushed with a different medium.

Figure 3:
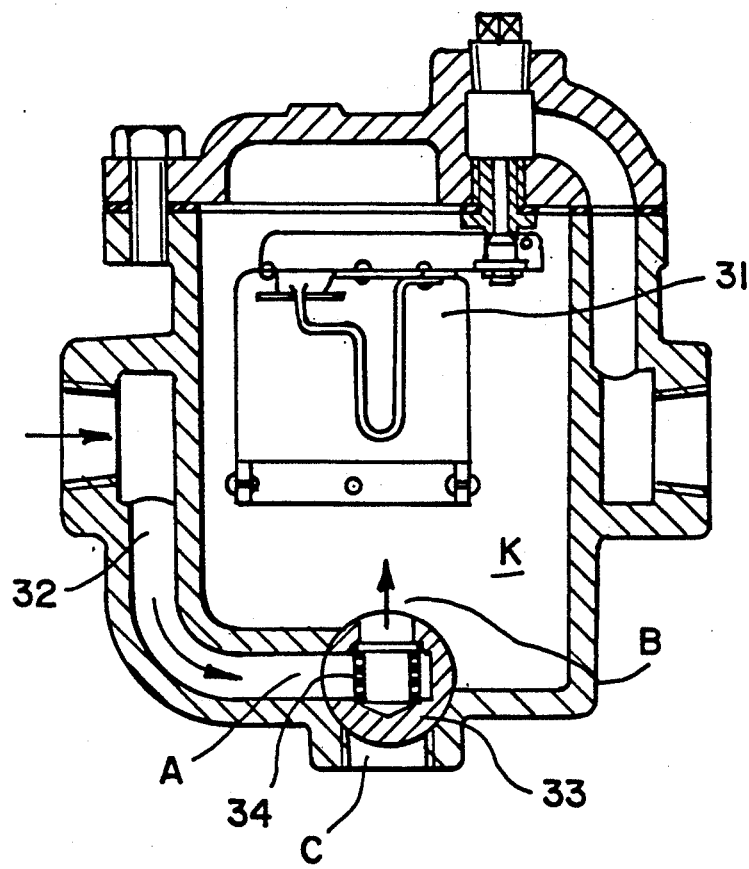
FIG. 3 is a sectional view showing the structural features of a second embodiment of the present invention.
Figure 3:
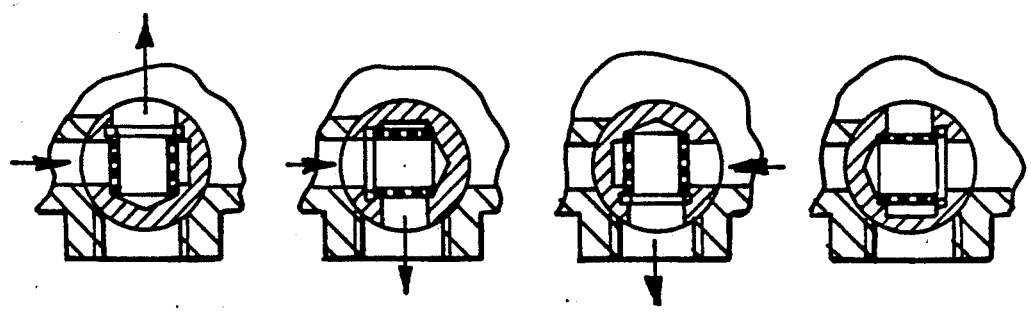

The second embodiment shown in FIG. 3 is a filtering steam trap with a by-pass. It comprises an ordinary steam trap 31, a conoidal plug valve 33. A L-shaped passage is provided in the plug and a filter element 34 is fitted therein. The valve body has an inlet port A and a by-pass port C for engagement with the rotatable plug 33, these two ports can be hermetically connected with the passage in the plug, in the same manner as has been described above. Another port B in the plug valve leads to the space K in the steam trap, connecting the space K with the ends of the L-shaped passage in the plug. FIGS. 3a–3d show the four flow modes attainable. In FIG. 3a the steam trap is in its normal working condition, with the condensate flowing through the filter into the trap. FIG. 3b shows the flow mode of reverse flushing, it is also the mode of pre-valve by-passing. The plug valve is placed in this mode, say, in the morning before starting the working shift, to have the filter element flushed and the flushing condensate is by-passed. FIG. 3c shows the plug valve in a draining mode, that is, in a post-valve by-pass mode. The plug valve is placed in this mode, say, in the evening after the working shift, so that the steam trap can be drained empty, and at places with sub-zero temperatures, damage of equipment due to freezing can be avoided. FIG. 3d shows the plug valve in its shut-off position, whereby repair work can be done on the steam trap.

Obviously the multi-way valve of the present invention can be incorporated into other kinds of automatic control valves, Such as pressure control valves, temperature control valves, Solenoid valves, and safety valves, etc., to replace the pipeline arrangements shown in FIG. 1a, rendering compact, multi-functional, cost effective and also easy-to-flush devices.

Figure 4A:
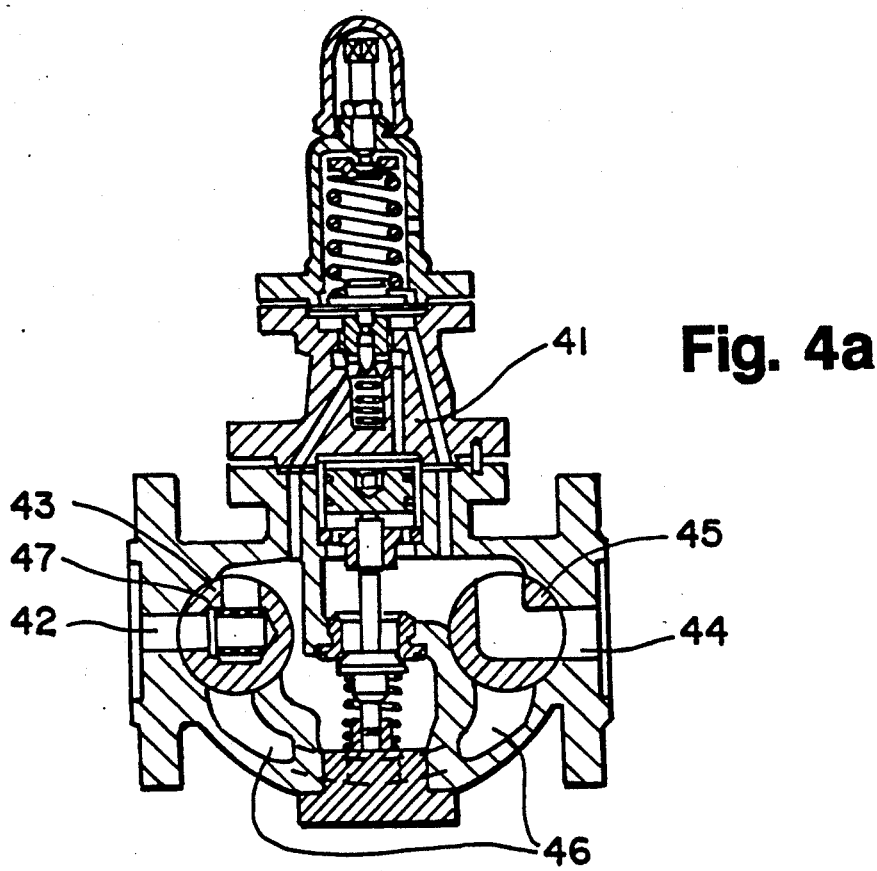
FIGS. 4a–4c are application examples of automatic control valve with two rotatable valve cores of the present invention and the different arrangements of the flow paths.
Figure 4B:
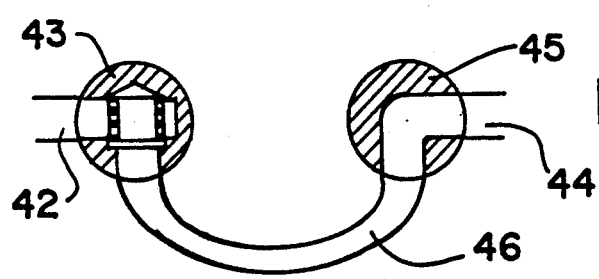
Figure 4C:
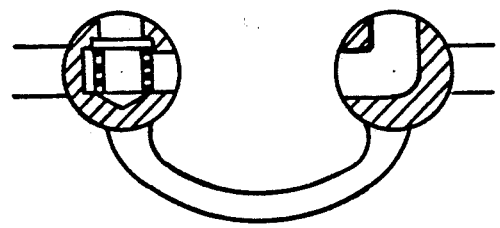

The multi-way valve of the present invention has an extensive field of application. FIG. 4 shows an embodiment with two rotatable valve cores 43 and 45 incorporated in the inlet and outlet passages 42 and 44 of a reducing valve 41, a connection 46 is provided between these two valve cores. The valve core 43 is fitted with a filter element 47 in its L-shaped passage. In FIG. 4a the L-shaped passages of the two valve cores 43 and 45 are respectively connected with the inlet and outlet and also the main passages of the reducing valve, which is in its normal operating condition. In FIG. 4b the valve cores form a by-pass to the reducing valve, the medium can still flow through the by-pass with the reducing valve out of operation, in this condition on-line repair work can be done on the reducing valve. FIG. 4c shows a condition wherein the reducing valve is completely isolated. Obviously these two rotatable valve cores can also be incorporated into other kinds of automatic control valves.

FIGS. 5a–5g show schematically the three-way or four-way valves of the present invention in use in pipeline systems in conjunction with valves, pumps, tanks, volumetric flowmeter or other apparatus represented by the rectangular symbol 53.

Figure 1E:
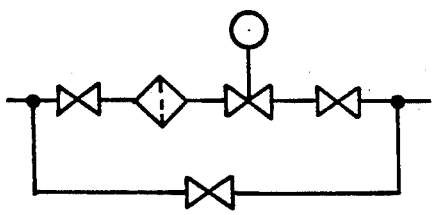

FIGS. 5a–5c show three different flow modes of two three-way valves 51 and 52 of the present invention used in conjunction with the apparatus 53, wherein the valve 51 has a built-in filter 54. This arrangement is similar to that shown in FIG. 4 and can replace the conventional arrangement shown in FIG. 1e.

Figure 1F:
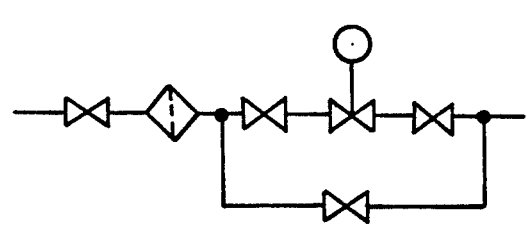

FIG. 5d shows a three-way valve 51 and a four-way valve 55 of the present invention used in conjunction with the apparatus 53. In this arrangement the effluent from reverse-flushing of the filter element through the by pass can be discharged through the fourth port of valve 55. This arrangement can replace the conventional arrangement shown in FIG. 1f. This arrangement can also be used in draining off the medium retained in the apparatus 53, as is shown in FIG. 5e.

FIGS. 5f and 5g show two four-way valves 55 and 56 used in conjunction with the apparatus 53. With this arrangement, besides the filter element can be flushed with a different medium, it can also effect the flushing of the apparatus 53. This arrangement can find extensive use, especially in the chemical, environ-mental, food and pharmaceutical industries, as equipments in these industries require frequent flushing with steam, water or other medium. The multi-way valves of the present invention will make the pipeline systems simple and easy to operate.

From the above it can be seen that the present invention offers many salient advantages by incorporating a multiplicity of functions in one valve, whereby a number of hand-operated valves can be omitted, the pipeline arrangements can be significantly simplified, their cost reduced and installation space curtailed. Such valves can have their filter elements expediently reverse flushed. They have ample flow cross-sections and are easy to operate, thus can be widely used.

What is claimed is:

1. A multi-way valve comprising: a valve body defining an inlet passageway, a first outlet passageway, and a second outlet passageway; a rotatable core rotatably mounted to the valve body, said core defining a core passageway; a filter member disposed in the core passageway; said core being rotatable to a first position for establishing fluid communication between the inlet passageway and the first outlet passageway through the core passageway and through the filter member along one direction of the filter member, to a second position for establishing fluid communication between the inlet passageway and the second outlet passageway through the core passageway and through the filter member along an opposite direction of the filter member, and to a third position for closing fluid communication between the inlet passageway and the outlet passageways.

2. The multi-way valve of claim 1, wherein the core passageway has a generally L-shaped configuration.

3. The multi-way valve of claim 1, wherein the centers of the inlet and outlet passageways lie on a common plane and the axis of rotation of the core lies generally perpendicularly to that plane.

4. A multi-way valve comprising: a valve body defining an inlet passageway, a first outlet passageway; a rotatable core rotatably mounted to the valve body, said core defining a core passageway and being rotatable to a first position for establishing fluid communication between the inlet passageway and the first outlet passageway through the core passageway, to a second position for establishing fluid communication between the inlet passageway and the second outlet passageway through the core passageway, to a third position for closing fluid communication between the inlet and outlet passageways, and to a fourth position for establishing fluid communication between the first outlet passageway and the second outlet passageway through the core passageway.

* * * * *